(12) United States Patent
Pang

(10) Patent No.: US 8,190,564 B2
(45) Date of Patent: May 29, 2012

(54) TEMPORARY SESSION DATA STORAGE

(75) Inventor: Youlun Pang, Austin, TX (US)

(73) Assignee: eBay, Inc., San Jose, CA (US)

( * ) Notice: Subject to any disclaimer, the term of this patent is extended or adjusted under 35 U.S.C. 154(b) by 281 days.

(21) Appl. No.: 12/712,514

(22) Filed: Feb. 25, 2010

(65) Prior Publication Data

US 2011/0208696 A1    Aug. 25, 2011

(51) Int. Cl.
*G06F 17/30* (2006.01)
(52) U.S. Cl. .......................... 707/610; 709/203; 718/105
(58) Field of Classification Search .................. 707/610, 707/639; 709/203; 718/105; 712/214
See application file for complete search history.

(56) References Cited

U.S. PATENT DOCUMENTS

| | | | |
|---|---|---|---|
| 7,406,524 B2 * | 7/2008 | Sadot et al. | 709/227 |
| 2011/0161980 A1 * | 6/2011 | English et al. | 718/105 |

* cited by examiner

*Primary Examiner* — Cheryl Lewis
(74) *Attorney, Agent, or Firm* — Haynes and Boone, LLP

(57) ABSTRACT

Systems and methods are provided according to one or more embodiments for a Distributed Temporal Data Storage (DTDS) architecture. In one embodiment, a system includes a load balancer located at one location. The system also includes at least one server coupled to the load balancer, wherein the load balancer is adapted to determine communication channels to reach the at least one server via a network. The system also includes one or more processors and one or more memories adapted to store a plurality of machine-readable instructions which when executed by the one or more processors are adapted to cause the system to store data in the at least one server as time based data in a corresponding time slot of a time based configuration according to an expiration time. The plurality of machine-readable instructions are also adapted to cause the system to allow retrieval of the stored data, wherein if the time based data is accessed within the expiration time, at least one time operation is triggered, and if the time based data is not accessed for a time longer than the expiration time, the time based data is removed from the time slot.

27 Claims, 5 Drawing Sheets

TEMPORARY SESSION DATA STORAGE

BACKGROUND

1. Technical Field

Embodiments of the present disclosure generally relate to data storage, and more particularly, to methods and systems for distributed, temporary storage of data.

2. Related Art

In current networks such as the Internet, a user may login, for example via a website on a browser for viewing website pages, and start a login session or session state. The session state may have related session data including user information and information on a current state. Session data provided in website pages may be stored in the browser, for example, as a cookie. However, this poses practical difficulties for session data storage as a browser or a cookie may not hold a lot of data. Also, a browser "Back" button may not be supported because the state for previous website pages may be expired due to security reasons. Furthermore, mobile device clients may not be able to handle session states because of hardware limitations.

In addition, if data is stored, for example in the browser, and the user deems appropriate to remove the data, the user has to physically remove such stored data. Otherwise, for example if the user forgets to log out, the data may remain stored for a long period of time, which may pose a security risk. There is no flexibility in accessing or removing data, managing the time or scaling up the storage of data.

SUMMARY

As will be further described herein in relation to one or more embodiments, methods and systems are provided for a distributed temporal data storage (DTDS) architecture that allows data or records to be stored for the duration of their life scope. The DTDS architecture according to one or more embodiments of the present disclosure is fast, reliable, scalable and manageable.

In accordance with an embodiment of the disclosure, a system includes a load balancer located at one location. The system also includes at least one server coupled to the load balancer, wherein the load balancer is adapted to determine communication channels to reach the at least one server via a network. The system also includes one or more processors and one or more memories adapted to store a plurality of machine-readable instructions which when executed by the one or more processors are adapted to cause the system to store data in the at least one server as time based data in a corresponding time slot of a time based configuration according to an expiration time. The plurality of machine-readable instructions are also adapted to cause the system to allow retrieval of the stored data, wherein if the time based data is accessed within the expiration time, at least one time operation is triggered, and if the time based data is not accessed for a time longer than the expiration time, the time based data is removed from the time slot.

In accordance with another embodiment of the disclosure, a method comprises providing access to a distributed storage system comprising at least one server in at least one location. The method also comprises storing data as time based data in the at least one server in a corresponding time slot of a time based configuration according to an expiration time. The method also comprises allowing retrieval of the stored data; wherein if the time based data is accessed within the expiration time, at least one time operation is triggered, and if the time based data is not accessed for a time longer than the expiration time, the time based data is removed.

In accordance with another embodiment of the disclosure, a distributed storage system comprises at least one or more servers located at geographically distributed locations, wherein the at least one or more servers are coupled to a load balancer at each location. The system also comprises one or more processors; and one or more memories adapted to store a plurality of machine-readable instructions which when executed by the one or more processors are adapted to cause the system to: store one or more records using a configuration that is adapted to be divided into one or more individual slots, wherein each slot is adapted to store the one or more records, wherein the one or more individual slots expire as time passes such that all records in an expired slot are moved unless there is a data access that triggers at least one time operation before the one or more individual slots expire.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

Figure 1:
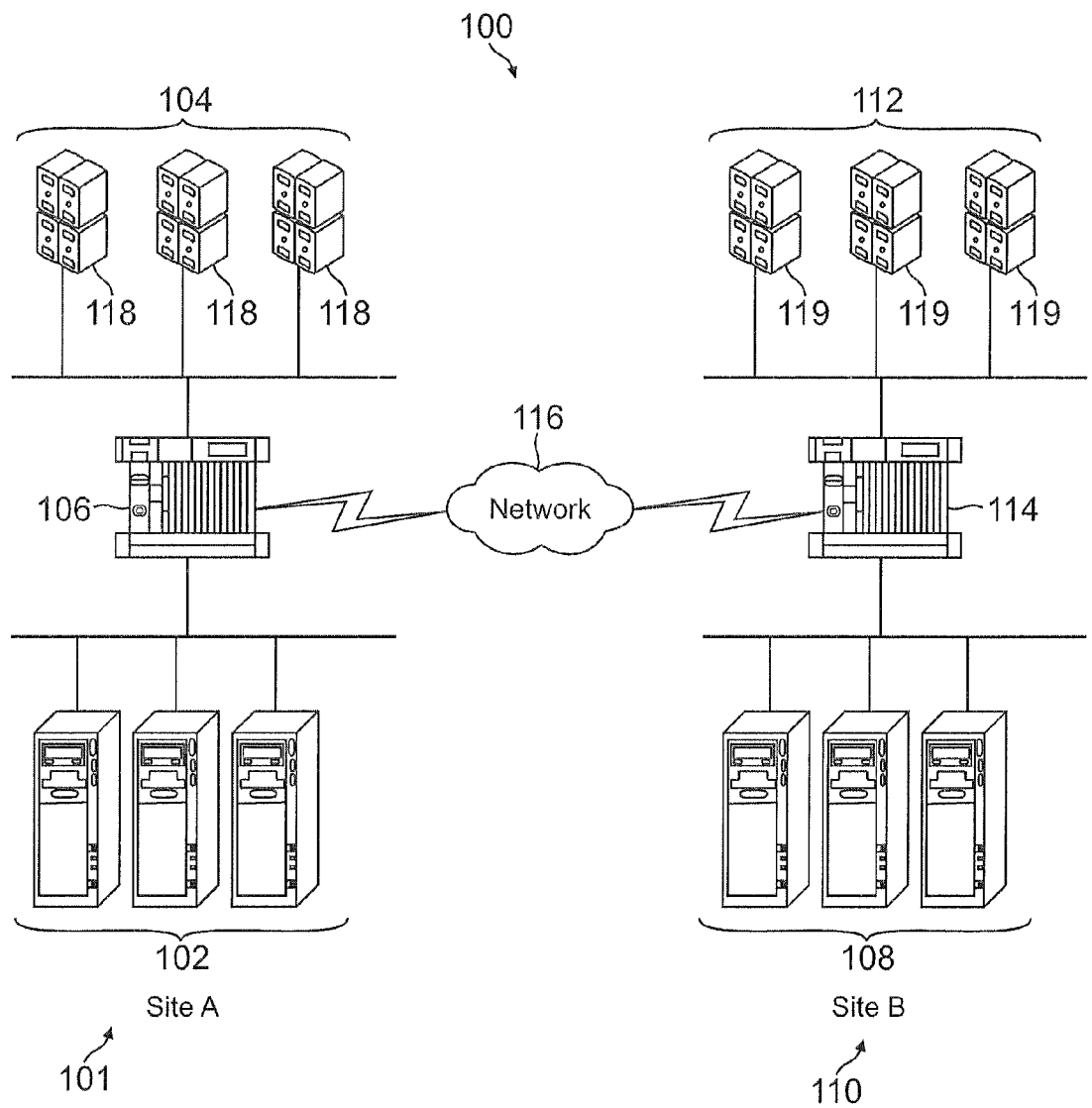
FIG. 1 is a diagram illustrating hardware components of a distributed temporal data storage (DTDS) architecture according to an embodiment of the present disclosure.

In accordance with one or more embodiments described herein, methods and systems are provided for a distributed temporal data storage (DTDS) architecture that may include one or more servers located at geographically distributed locations. The DTDS architecture may allow data or records to be stored, for example, as time-based data for a predetermined duration. An application may retrieve a stored record to restore a session. In one example, with the DTDS architecture, a browser may only need to keep track of session identifiers or IDs. The browser may then move forward or backward with the session IDs.

During a login session or session state, session data may be stored temporarily using an appropriate configuration such as a ring-like configuration that may support time-based data. For example, a ring-like configuration may be divided into individual slots such as one-minute time slots. Each slot may have multiple records, and each record may be associated with an identifier. The identifier may be a hash from a hash table, conveyed via a token. The hash allows a record to be quickly located and moved, deleted, revised, or otherwise processed. Slots may expire as time passes, such that all the records in a slot may be moved when a slot expires. For example, slots may expire and data may be removed after a predetermined time period of inactivity. All operations within the ring-like configuration may take about the same time, regardless of the number of linked records in a slot. In addition to information about how to get a particular record, the token may include server information such as a server identifier or ID used to locate the server instances where the data or record is stored. According to one or more embodiments, DTDS is a distributed system which consists of multiple server instances. A server identifier or ID typically consists of an IP address and a port number. In a token, there may be a server identifier or ID for a primary server where the data or record is stored as well as zero or more server identifiers or IDs for the secondary servers where copies of the data or record may be stored.

In other embodiments, the server information may be contained in a key. With a key, an application does not need to keep track of the token because when a user logs in, user information such as a user identifier or ID or account number is available so the application does not need to pass this user information along, resulting in a quicker process. That is, user information may be stored in the payload or data body and is therefore available therein as the server may treat the payload as an opaque binary block.

Advantageously, embodiments of the present disclosure provide a DTDS architecture that meets several requirements including requirements for high performance, scalability, security, low cost, high availability, flexibility, ease of use and compatibility with standards. The DTDS architecture has high performance as it supports basic operations with a small latency independent of number of records stored. The DTDS architecture is scalable as it supports a current peak throughput and is able to scale up for future growth. The DTDS architecture is secure as records may be securely transmitted over a network in an encrypted manner. The DTDS architecture is low cost as it may run on a group of low cost servers that should be easy to maintain with low cost operation. The DTDS architecture is highly available as records stored in the DTDS architecture may be replicated such that a single server failure does not result in loss of data wherein a problematic server may be removed from the group at runtime and a replacement server may be added to the group at runtime with minimal disruption of service. The DTDS architecture is flexible as it is highly configurable and may not depend on a specific payload size. The DTDS architecture is easy to use as a minimized and well defined interface may be provided and may be easily integrated to other components of, for example, a larger service provider server. Finally, the DTDS architecture may be compatible with standards.

Referring now to the drawings wherein the showings are for purposes of illustrating embodiments of the present disclosure only, and not for purposes of limiting the same, FIG. 1 is a diagram illustrating hardware components of a distributed temporal data storage (DTDS) architecture according to an embodiment of the present disclosure.

A distributed temporal data storage (DTDS) architecture 100 includes a DTDS system 101 located at a Site A and a DTDS system 110 located at a Site B. Site A and Site B may be different geographical locations. DTDS system 101 includes an application server pool 104, which includes one or more application servers 118, and one or more DTDS servers 102 located at Site A. DTDS server(s) 102 and application server pool 104 may be coupled to a router or load balancer 106. DTDS system 110 includes an application server pool 112, which includes one or more application servers 119, and one or more DTDS servers 108 located at Site B. DTDS server(s) 108 and application server pool 112 may be coupled to a router or load balancer 114.

All servers at a location, for example servers of DTDS system 101 at Site A and servers of DTDS system 110 at Site B, may be in the same subnet behind a respective load balancer 106 or 114, and may communicate or interact with each other via a network 116. In various embodiments, network 116 may include a wireless application network (WAN), the Internet or one or more intranets, landline networks, wireless networks, and/or other appropriate types of networks.

Application server pools 104 and 112 may each include application server(s) 118 and 119, respectively, which manage applications such as software applications related to functions or operations of DTDS architecture 100. An application server may only exist in one application server pool. For instance, an application server 118 exists in application server pool 104 while an application server 119 exists in application server pool 112. Application server(s) 118 and 119 may also be referred to as "DTDS clients." It should be noted that the terms "server" and "client" are relative terms. For example, an application may be the client in a DTDS system, and at the same time, it may be the server of a browser.

DTDS clients may communicate with DTDS server(s) 102 or 108 both directly and/or through the load balancers. Also, all servers may be reached by a remote client using a same address as a local client. Each location, for example Site A or Site B, may have a virtual IP address shared by all of the servers at the respective location. DTDS clients may access servers such as DTDS server(s) 102 or DTDS server(s) 108 by the respective virtual IP address as well as by a dedicated IP address for a specific server.

Generally, DTDS architecture 100 according to one or more embodiments may be a distributed service that may run at one or more geographically distributed locations. At each location there may be one or more DTDS systems such as DTDS system 101 and/or DTDS system 110 each including one or more DTDS servers 102 and 108 respectively, which may store data that a client may retrieve later. DTDS servers 102 and/or 108 may be low end servers. In this case, having DTDS architecture 100 run on a group of low end servers by way of a distributed architecture helps reduce overall capital costs.

DTDS server(s) 102 and 108 as well as application server(s) 118 and 119 of application server pools 104 and 112, respectively, may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over network 116, which may be implemented as a single network or a combination of multiple networks.

Figure 2:
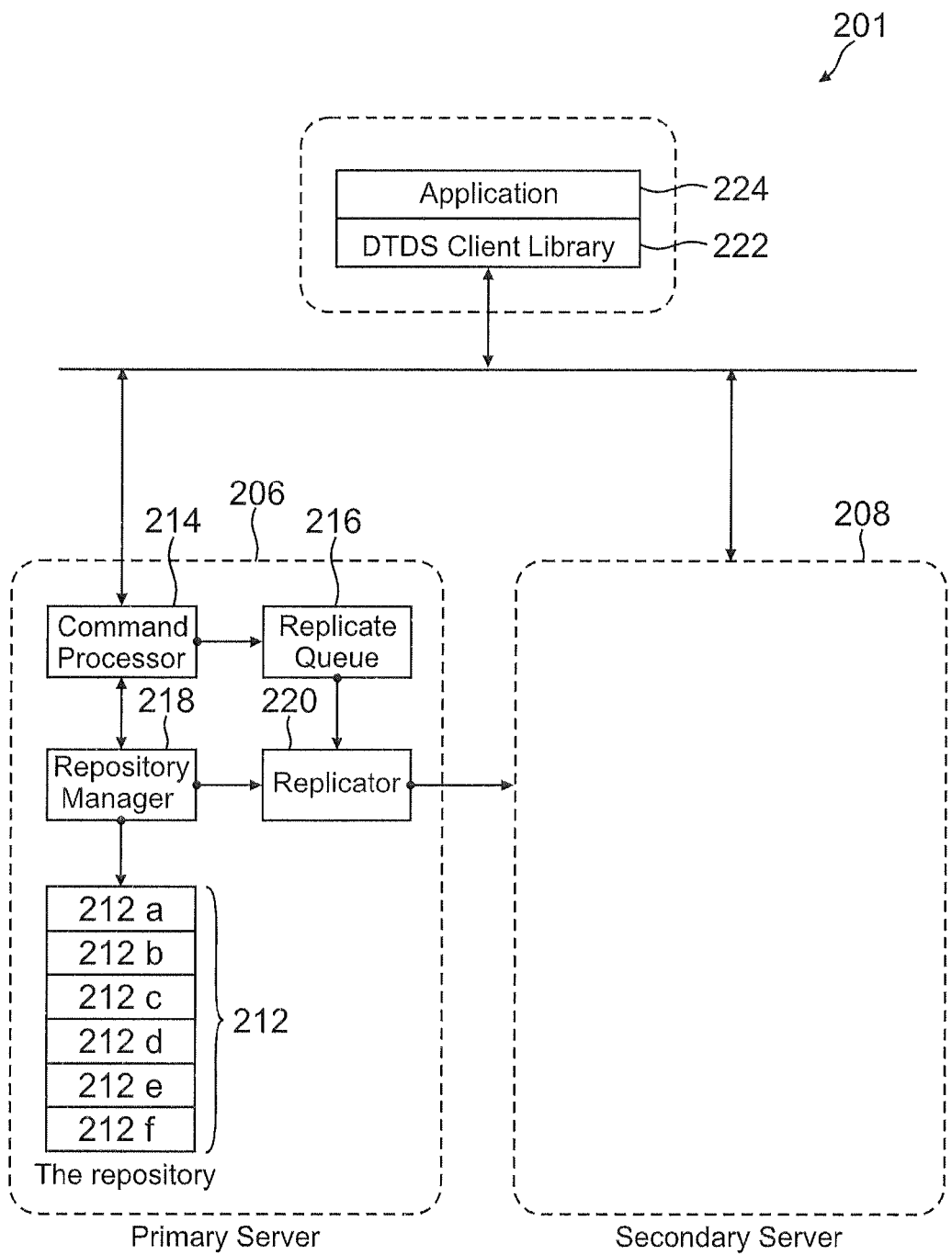
FIG. 2 is a diagram illustrating software components of a DTDS system according to an embodiment of the present disclosure.

FIG. 2 is a diagram illustrating software components of a DTDS system according to an embodiment of the present disclosure. The DTDS software system of FIG. 2 may be implemented by DTDS system 101 and/or DTDS system 110 of FIG. 1 according to one or more embodiments.

In FIG. 2, DTDS software system 201 includes a client side library 222, which may be part of application server(s) 118 or 119 (shown in FIG. 1), as a linked library to an application 224. A DTDS primary server 206 may be used to store one or more given records. A secondary server 208 may be used to store a copy of one or more given records. It should be noted that a secondary server may or may not be used to also store the given record, that is, there may be zero or more secondary servers storing the given record. DTDS primary server 206 storing a given record and DTDS secondary server 208 (if used for storing a copy of the record) may be implemented by DTDS server(s) 102 at site A or DTDS server(s) 108 at site B (shown in FIG. 1), respectively.

Client side library 222 may include software code linked with application 224 and is configured to interact with DTDS primary server 206 and/or DTDS secondary server 208. In this regard, DTDS software system 201 may have components including network/socket components configured to handle network connections, receive, send and multiplex message processing to and from clients. It may also be configured to handle protocols such as SSL and various types of sockets such as INET.

Primary server 206 and secondary server 208 may be logical servers as implemented by a software server. A logical server may be identified by an IP address and a network port number. The network port may be a listener port so that the logical server may receive network connect requests. Each logical server may be implemented with a single execution thread that simplifies code and avoids overhead for instances such as locking. One or more logical servers may run on a physical server such as a computer server. For example, primary server 206 and secondary server 208 as logical servers may run on a physical server such as DTDS server(s) 102 at Site A or DTDS server(s) 108 at Site B, as shown in the embodiment of FIG. 1.

Each DTDS server such as DTDS primary server 206 may include a command processor 214, a replicate queue 216, a replicator 220, a repository manager 218 and a record repository 212.

Record repository 212 may be maintained in-memory and may include at least one record such as records 212a-212f stored therein. Record repository 212 itself may reside in heap space or dynamic memory allocation. Records 212a-212f stored in primary server 206 may be referred to as primary records, which correspond to the first copies of the records in DTDS software system 201. For instance, primary server 206 is a logical server that stores the primary copy of the record. At least one of records 212a-212f may be divided into fixed size pages wherein each page may be of the same configurable size. Generally, a DTDS system is secure as records may be securely transmitted over a network in an encrypted manner. Encryption and decryption may be done by an application that uses the DTDS system, which may treat a record's contents as an opaque data block. That is, in various embodiments, DTDS servers may treat records 212a-212f as opaque data blocks, thus enhancing the security of the contents of the records.

Repository manager 218 is configured to manage record repository 212. In an embodiment, an in-memory index may be maintained that allows fast searching of records 212a-212f in record repository 212.

Replicate queue 216 may include First In First Out (FIFO) logic and may be configured to control each one or blocks of records 212a-212f for newly saved primary copies of records 212a-212f. In an embodiment, replicate queue 216 may be a circular storage that may be able to grow if needed and may only contain the headers of the records.

Replicator 220 is configured to establish a connection to at least one secondary server 208 and send the primary copies of records 212a-212f to at least one secondary server 208, where they will be maintained as secondary copies of the records. For instance, a logical server will replicate its primary copy of the records such as records 212a-212f to another logical server, which is the secondary server, so that each record will have one primary server and zero or more secondary servers. In an embodiment, at any given time, secondary server(s) 208 may be fixed so that primary server 206 may maintain persistent INET connection(s) to secondary server(s) 208. Thus, embodiments of DTDS software system 201 provide high availability as more than one copy of each of records 212a-212f may be maintained.

As discussed above, any of DTDS servers 102 and/or 108 (shown in FIG. 1) may be a primary server for some data or records stored therein, and at the same time, any of those servers may be a secondary server for other data or records stored therein. For instance, each logical server may be the primary server for some records as well as the secondary server for some other records. A record may have more than one secondary server.

In an embodiment, primary server 206 may monitor the status of secondary server 208, for example, by using SIG-PIPE. If secondary server 208 fails, primary server 206 may try to reestablish a connection to a different backup or secondary server. After that, primary server 206 may discard any data in replicate queue 216 because no valid backup server may be available.

Each one of records 212a-212f may have a record identifier or ID, which may be a scalar value that uniquely identifies each of records 212a-212f within its primary server plus the IP address of the primary server. Record identifiers or IDs may be unique within an instance of a DTDS system. Furthermore, each one of records 212a-212f may have a Fully Qualified Record ID, which includes the record identifier or ID plus IP addresses of secondary servers that store copies of the record.

DTDS primary server 206 may also include command processor 214, which may be configured to handle requests from clients made via application programming interfaces (API) calls. To handle client connection requests, a connection between a client and a server such as primary server 206 may be SSL, which is configurable. The connection to the server may be established the first time a request is made by a client with an application in application block 224 via, for example, Webscr, mobile or the like. Use of SSL may prevent unauthorized access to the servers.

In various embodiments, a client may use a local virtual IP address to access a DTDS server to send a request for a basic operation. The IP address for the primary server may be used for subsequent accesses. Because of the differences of the latency/overhead for remote access and local access, the local server of the record should be tried first. A primary server may be the local server for the life span of a record. In an embodiment, the client may connect to a local server via the virtual IP address. Then the client may send a request for a basic operation to the local server that may then be replicated to a remote server such as a secondary server.

Various APIs may be provided using application block 224 including the following requests for record repository basic operations: "Create a Record," "Update a Record," "Get a Record," "Delete a Record," and "Trade in a Record."

To "Create a Record," a client may submit, for example during a login session or by an API call, the contents of a record to the DTDS system. In turn, the DTDS system may create and store the record in record repository 212 of primary server 206. The DTDS system may then return a record identifier or ID, which may be a scalar value that uniquely identifies the record within its primary server plus the IP address of the primary server. If applicable, the DTDS system may also return a Fully Qualified Record ID, which includes the record identifier or ID plus IP addresses of secondary servers that store copies of the record. Also, a record header and content may be created. As will be described in more detail below according to an embodiment, the created record may be deleted automatically after a pre-determined time of inactivity.

To "Update a Record," the client may submit the appropriate record identifier or ID or a Fully Qualified Record ID along with the new record content to the DTDS system. In turn, the DTDS system replaces the stored record content with the new record content. In an embodiment, a record version, which may be a small integer that specifies the version of a record, may be increased when a record is updated. For example, a newly created record may be a version 1, and each time the record us updated, its version may be increased by 1. A record version may be part of the record identifier or the Fully Qualified Record ID that may be returned or sent back to a browser for review or use. In an embodiment, a record version may be used to detect an outdated record. For example, a primary server storing the record may be terminated immediately after a record is updated, but before the updated record is replicated to a secondary server. In this case, a client may retrieve the record from the secondary server. The client may then compare the retrieved version from the secondary server to a version stored in the client's browser, and take appropriate action when the record version from the secondary version does not match the browser version.

To "Get a Record," the client may submit the appropriate record identifier or ID or a Fully Qualified Record ID object and in turn, the DTDS system returns the record content specified by the record ID object.

To "Delete a Record," the client may submit the appropriate record identifier or ID or a Fully Qualified Record ID object and in turn, the DTDS system deletes all stored copies of the record.

To "Trade in a Record," which may be equivalent to deleting an old record followed by creating a new record, the client may submit the appropriate record identifier or ID or a Fully Qualified Record ID of the old record along with the new record content. In turn, the DTDS system deletes the old record, then creates a new record and returns an appropriate record identifier or ID or a Fully Qualified Record ID of the new record. The appropriate record identifier or ID or a Fully Qualified Record ID for the new record should be different than the record identifier or ID or a Fully Qualified Record ID of the old record.

Router or load balancer 106 or 114 (shown in FIG. 1) may be used to determine the destination of a communications channel, which may reduce the complexity of code and operational overhead. DTDS software system 201 incorporates code that does not depend on any networking specifics such as the number of servers or the IP address of the servers. Such code uses routers or load balancers 106 or 114 to reach a server in several ways, for example: a) when a record is created, the client may use the local virtual IP address to select a local server, or b) a server may use a remote virtual IP address to select a remote backup server. When a server fails, a server(s), as the backup, may use the remote virtual IP to select another backup server.

Figure 3:
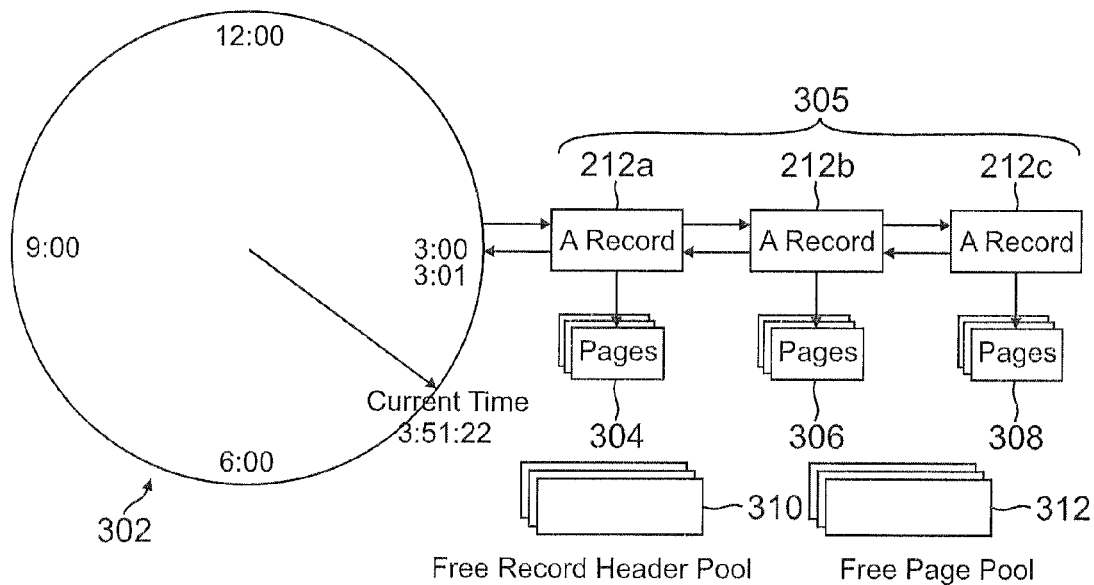
FIG. 3 is a diagram illustrating a record repository for a DTDS architecture according to an embodiment of the present disclosure.

Referring to FIG. 3, a diagram illustrates a record repository for a DTDS architecture according to an embodiment of the present disclosure. The record repository of FIG. 3 may be implemented by primary server 206 including record repository 212 of FIG. 2 according to one or more embodiments.

There are different ways to organize the record repository. Records may be removed from the record repository either by a "Delete" request, or when the records are expired. In an embodiment, records may be organized by their timestamp or expiration time.

In FIG. 3, a time based configuration that may include a ring like configuration such as a clock based main storage structure 302 is used for clock based time priority queue that allows a constant access time as will be described in more detail below.

In this embodiment, records may be organized in various levels including a top level, which corresponds to clock based main storage structure 302. Clock based main storage structure 302 may be represented as a logical circular structure with each entry representing a time slice, for example, in one-minute increments. A data structure such as a Double Linked List 305 that may include one or more records such as records 212a, 212b and 212c may be present on each entry representing a time slice of clock based main storage structure 302. For example, Double Linked List 305 having records 212a-212c may be present in a time slice entry between 3:00 and 3:01. Any appropriate records with an expiration time may fall inside the time slice and may be put on Double Linked List 305.

Each record 212a, 212b and 212c may be a record header linked to respective pages 304, 306 and 308. Pages 304, 306 and 308 may be fixed-sized contiguous memory blocks. The size of a page may be between about 1 KB to 16 KB. Pages may reduce fragmentation of data and simplify page pool management. The total memory required to store records in a particular server is much lower when multiple, distributed servers are used than when a single server per site is used.

Records may be stored for a minimum record storage time (MRST), so that records that have not been accessed for a time longer than their expiration time may be removed from the record repository, which may be due to memory pressure. A default MRST may be set as the minimum time that a record will be stored when a client does not specify an expiration time. For example, the default MRST may be about 10 minutes. A record that has not been accessed or touched for more than the MRST may be removed from the DTDS system. The expiration time may be set system wide such that it is not related to a specific record. That is, all the records in a time slice may expire at the same time and may be removed as a batch.

A free record header pool 310 and a free page pool 312 may be available when no records are used so that memory space is available. Free page pool 312 may include First In Last Out (FILO) logic wherein pages may be dynamically allocated to a session, for example a login session, and freed when the session expires.

When a record is accessed, for example in connection with a read, get, write, or update operation, its expiration time may be updated and the record may be moved from one time slice to another time slice of clock based main storage structure 302. The record may be taken off its original linked list and may be put in the front of the linked list hanging on the time slice for its new expiration time. Both removing a record from the middle of a doubled linked list and adding a record to the front of a linked list may have constant or even sub-constant access time. Sub-constant access time may refer to a case where the average time to handle a record may be reduced when the number of records increases. This constant access time algorithm can support a record level expiration time with very high performance and scalability.

In this manner, the expiration time may not need to be accurate. Normally, a low resolution such as a resolution of about one minute, may be sufficient. For example, if clock based main storage structure 302 is a 24 hour clock, there are 1440 entries of one minute each. Each entry is a pointer. Clock based main storage structure 302 only takes a few KB of memory.

Advantageously, a ring like configuration such as clock based main storage structure 302 allows for time related operations such as updating the timestamp or expiration time of a record to be done in constant or even sub-constant access time, thus requiring low CPU consumption and efficient usage of memory. Time operations may be frequent operations since any data access will trigger time operations. Memory usage may be dynamically adjusted to workload. This unique organization scheme allows for better performance and better scalability.

Figure 4:
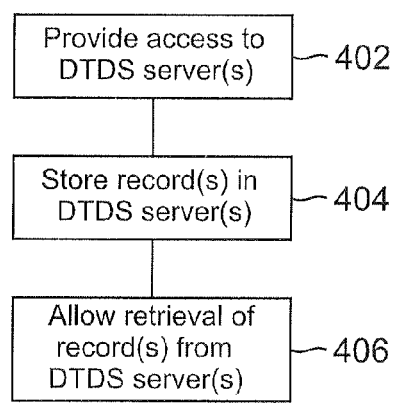
FIG. 4 is a flow chart illustrating a method for a DTDS architecture according an embodiment.

FIG. 4 is a flow chart illustrating a method for a distributed temporal data storage (DTDS) architecture according an embodiment. The method of FIG. 4 may be implemented by the system of FIG. 1 and FIG. 2 according to an embodiment.

In block 402, a client may be provided with access to the DTDS system by using, for example, a virtual IP address of a DTDS server, or an IP address for a specific server of the DTDS system.

In block 404, the DTDS server stores one or more records created by the client in one or more servers of the DTDS system. The record(s) may be stored as time based data as described above according to one or more embodiments with respect to FIG. 3. Also, as described above, a primary copy of the record(s) created by the client may be stored in a primary server. A secondary copy, which is replicated from the primary copy, may be stored in zero or more secondary servers of the DTDS system.

In block 406, the client may retrieve one or more records from the DTDS servers. At this point, the time slot of the record(s) is updated as part of the retrieval or access, for example, to perform an operation such as a read/get or a write/update operation.

Figure 5A:
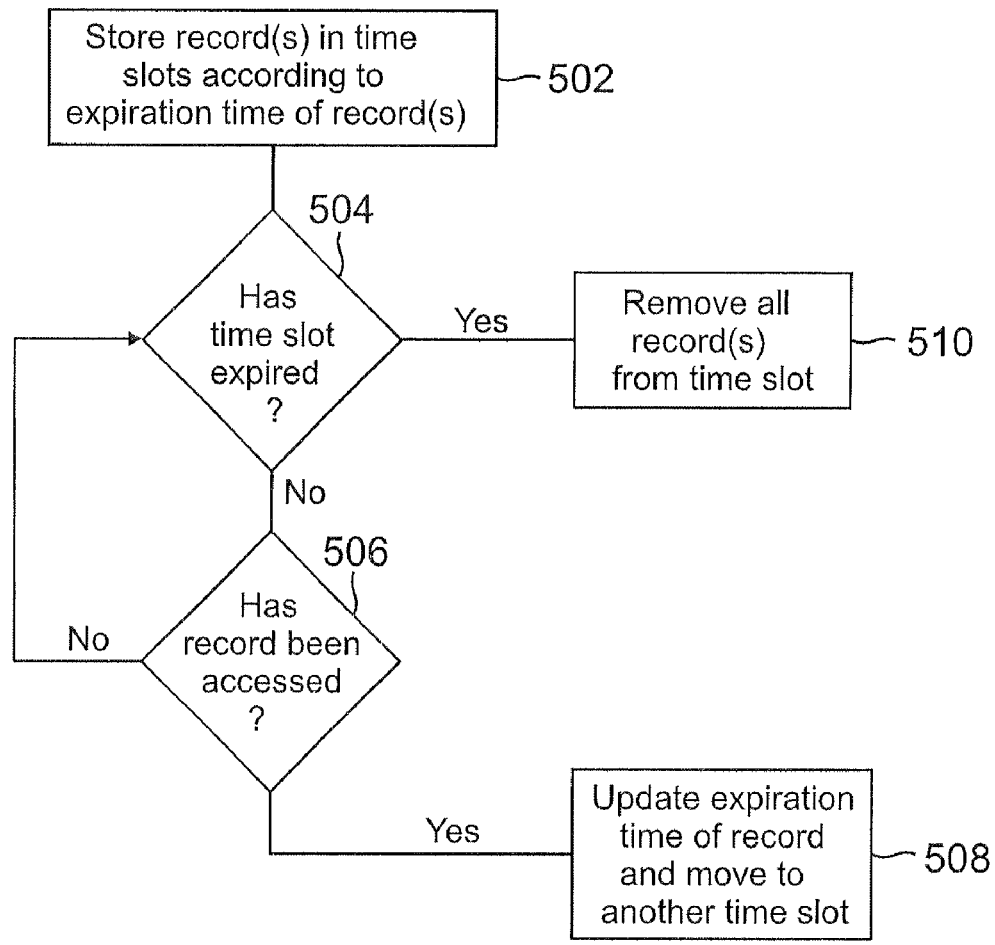
FIG. 5a is a flow chart illustrating a method for storing records in a DTDS architecture according to an embodiment.

FIG. 5a is a flow chart illustrating a method for storing records in a DTDS architecture according to an embodiment. The flowchart of FIG. 5a may be one implementation of block 404 of FIG. 4 according to an embodiment.

In block 502, one or more records may be stored in a DTDS server in appropriate time slots or slices according to the expiration date of the records. As described above, a ring-like configuration may be used wherein the records may be stored into individual time slots such as one minute slots. Each slot may store multiple records.

In block 504, as time passes, the time slots expire. If a time slot has expired, all records in the time slot expire and are removed as a batch (block 510).

In block 506, a record may be accessed within the slot expiration time. If the record is accessed, the expiration time of the record is updated and the record is moved to another time slice (block 508). On the other hand, after a period of inactivity wherein a record is not accessed for a time longer than its expiration time, the record is removed along with all records in the expired time slot (block 510).

Figure 5B:
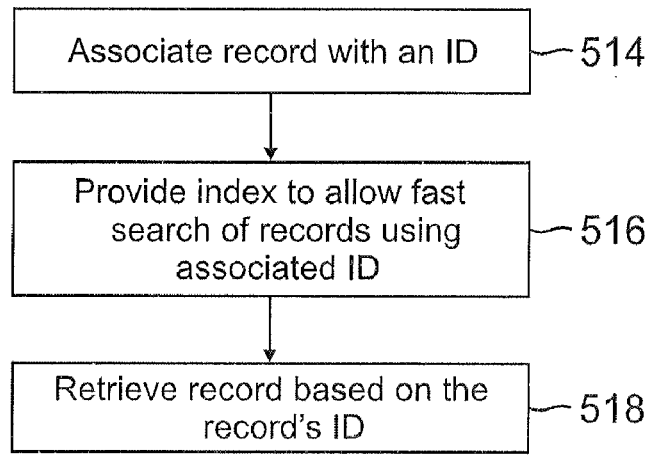
FIG. 5b is a flow chart illustrating a method for retrieving records from a DTDS architecture according to an embodiment.

FIG. 5b is a flow chart illustrating a method for retrieving records from a DTDS architecture according to an embodiment. The flowchart of FIG. 5b may be one implementation of block 406 of FIG. 4 according to an embodiment.

In block 514, stored records may be associated with a respective record identifier. As described above, the record identifier may include a Fully Qualified Record ID, which may include a unique record identifier associated with a primary server where the record is stored plus a primary server identifier as well as a secondary server identifier as applicable, for example, depending on if secondary copies of the records are stored in one or more secondary servers.

In block 516, an index is provided that allows fast searching of a record using the record's ID. In general, a record repository such as record repository 212 of FIG. 2 may include two parts, an index that allows fast access to a stored record having a record identifier or ID, and the record store itself. The main index of the record repository may have different forms such as a hash map, a tree, or the like. In an embodiment, the main index may be a hash map with the record identifier or ID as the key and a record header as the value. Hash may be faster than other options such as a tree. The record header may be part of a record header pool, which may be a typical object pool.

In block 518, a record is retrieved based on the record's ID and a client may request, for example by an API call, to perform basic operations on the record.

Advantageously, embodiments of the present disclosure may provide a DTDS architecture that may meet various requirements including high performance, scalability, security, cost, availability, and flexibility. The DTDS architecture according to one or more embodiments has high performance as it supports basic operations with a small latency. For example, basic operations as requested via API calls may have a small average latency in terms of milliseconds. As described above, time related operations, such as updating the timestamp or expiration time of record(s), which may be frequent as any data access triggers time operations, may be done in constant or even sub-constant time.

The DTDS architecture according to one or more embodiments is scalable as it supports a current peak throughput and is able to scale up for future growth. That is, the DTDS architecture may not impose a practical limitation in terms of throughput and storage capacity. For instance, the DTDS architecture is a high performing architecture that may handle millions of users.

The DTDS architecture according to one or more embodiments is secure as records may be securely transmitted over a network in an encrypted manner. Encryption and decryption may be done by an application that uses the DTDS architecture, which may treat a record's contents as an opaque data block.

The DTDS architecture according to one or more embodiments is low cost as it may run on a group of low cost servers that should be easy to maintain with low cost operation. In addition, operational overhead costs may be reduced by making the DTDS architecture adaptive to environmental changes so that less manual operation is needed. The DTDS architecture may allow runtime topological changes without incurring software configuration changes, that is, software may be adaptive to hardware topological changes.

The DTDS architecture according to one or more embodiments is highly available as records stored in the DTDS architecture may be replicated such that a single server failure does not result in loss of data wherein a problematic server may be removed from the group at runtime and a replacement server may be added to the group at runtime with minimal disruption of service. Backups may significantly improve availability. For example, availability may be 99.9% for a single server, and for a system with one backup copy, the availability may be 99.9999% (not including disruption due to external causes such as manual maintenance or network failure).

The DTDS architecture according to one or more embodiments is flexible as it is highly configurable and may not depend on a specific content or payload size. The DTDS architecture may be configured to run in various environments including: multi-sites (as illustrated in the embodiment of FIG. 1), a single site with multiple servers, a single dedicated server, or a shared server including running on the same server as the client's.

The DTDS architecture is easy to use as a minimized and well defined interface may be provided and may be easily integrated to other components of, for example, a larger service provider server. Finally, the DTDS architecture may be compatible with standards in the industry.

Figure 6:
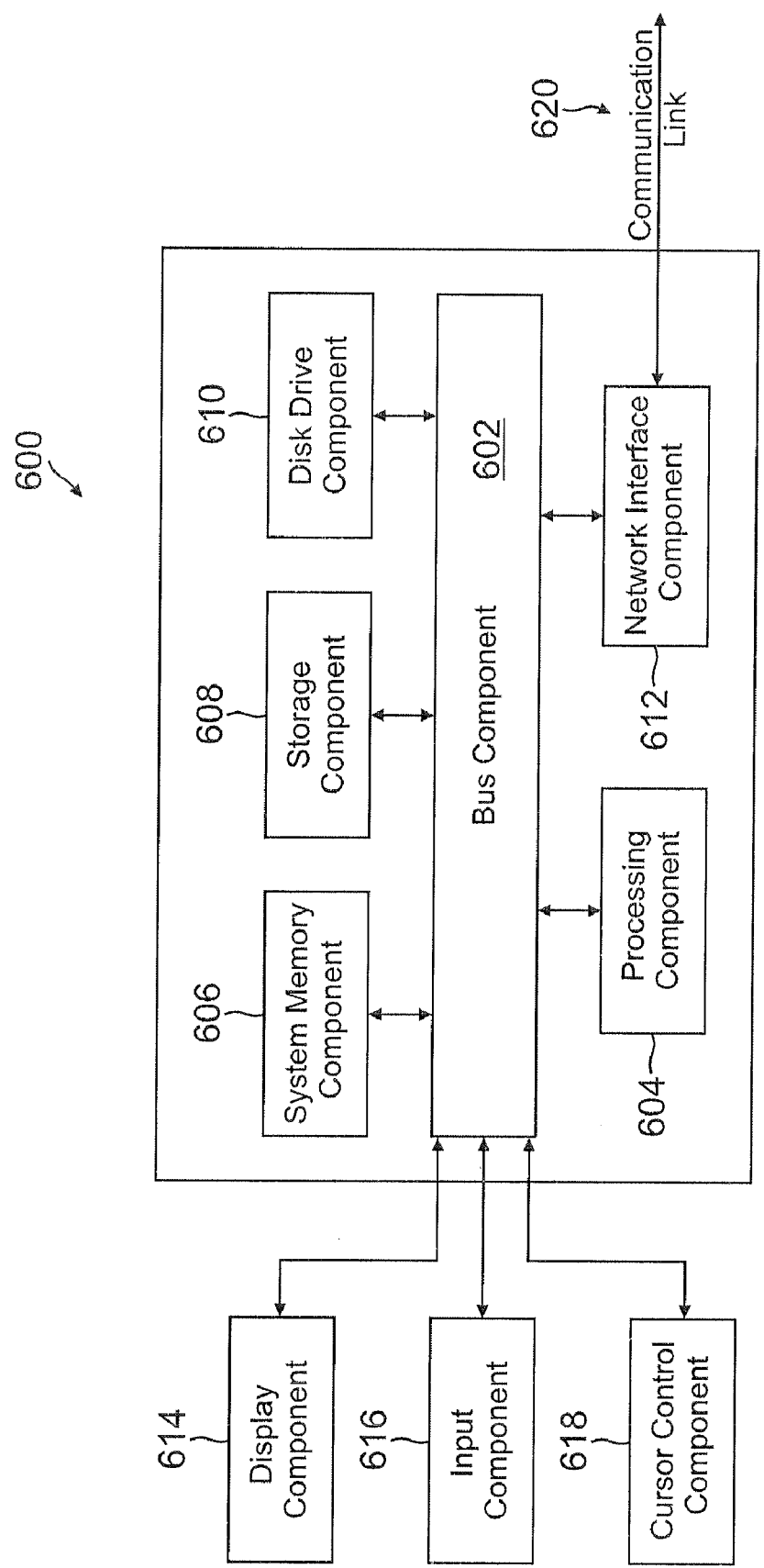
FIG. 6 is a block diagram of one embodiment of a system that may be used to implement one or more components of the architecture of FIG. 1.

FIG. 6 is a block diagram of a computer system 600 according to one embodiment, which may be suitable for implementing embodiments of various aspects of this disclosure, including, for example, DTDS server(s) 102, DTDS server(s) 108, application server(s) 118 and/or application server(s) 119. In various implementations of various embodiments, DTDS server(s) 102, DTDS server(s) 108, application server(s) 118 and/or application server(s) 119 may comprise a network computing device, such as one or more servers, computer or processors combined to implement the DTDS architecture functions. Thus, it should be appreciated that DTDS server(s) 102, DTDS server(s) 108, application server(s) 118 and/or application server(s) 119 may be implemented as computer system 600 in a manner as follows.

In one embodiment, computer system 600 may include a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 616 (e.g., keyboard or keypad), and/or a cursor control component 618 (e.g., mouse or trackball). In one embodiment, disk drive component 610 may comprise a database having one or more disk drive components.

Computer system 600 may perform specific operations by processor 604 executing one or more sequences of one or more instructions contained in system memory component 606, according to steps described above with respect to FIGS. 2-5b. Such instructions may be read into system memory component 606 from another computer readable medium, such as static storage component 608 or disk drive component 610. In other embodiments, hard-wired circuitry may be used in place of or in combination with software instructions to implement one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments, execution of instruction sequences for practicing embodiments of the disclosure may be performed by computer system 600. In various other embodiments, a plurality of computer systems 600 coupled by communication link 620 (e.g., network 102 of FIG. 1, LAN, WLAN, PTSN, or various other wired or wireless networks) may perform instruction sequences to practice one or more embodiments of the disclosure in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in foam and detail without departing from the scope of the disclosure. Thus the disclosure is limited only by the claims.

What is claimed is:

1. A system comprising:
a load balancer located at one location;
at least one server coupled to the load balancer, wherein the load balancer is adapted to determine communication channels to reach the at least one server via a network;
one or more processors; and
one or more memories adapted to store a plurality of machine-readable instructions which when executed by the one or more processors are adapted to cause the system to:
store data in the at least one server as time based data in a corresponding time slot of a time based configuration according to an expiration time; and
allow retrieval of the stored data;
wherein if the time based data is accessed within the expiration time, at least one time operation is triggered, and if the time based data is not accessed for a time longer than the expiration time, the time based data is removed from the time slot, wherein the at least one server comprises software components including a record repository component, a request processor component, a repository manager component, a replicate queue component and a replicator component' wherein the record repository component further comprises an index adapted to allow fast access to the one or more records by a corresponding record identifier, and wherein the record identifier further comprises a Fully Qualified Record ID comprising a scalar value uniquely identifying a record within a primary server plus an identifier for the primary server and an identifier for a secondary server that store one or more copies of the record.

2. The system of claim 1 wherein the system is configured to run at one or more geographically distributed locations, wherein a group of servers is coupled to the load balancer at each location.

3. The system of claim 2, wherein the plurality of machine-readable instructions are adapted to provide access to all servers of the group via a virtual IP address, wherein the virtual IP address is shared by all the servers of the group at each location.

4. The system of claim 1, wherein the at least one server is configured as a primary sever, and wherein the plurality of machine-readable instructions are further adapted to store some of the data in the primary server.

5. The system of claim 4, wherein the at least one server is configured as a secondary sever, and wherein the plurality of machine-readable instructions are further adapted to store some other data in the secondary server.

6. The system of claim 1, wherein the at least one time operation further comprises updating the corresponding time slot and the at least one time operation is triggered in constant time.

7. The system of claim 1, wherein the plurality of machine-readable instructions are adapted to cause the system to receive requests to perform basic operations on the stored data.

8. The system of claim 1, wherein the data further comprises one or more records stored in the record repository component.

9. The system of claim 1 wherein the record identifier further comprises a hash and the index comprises a hash map with the record identifier as a key and a record header as a value.

10. The system of claim 1, wherein the plurality of machine-readable instructions are adapted to cause the system to: store the data using a ring-like configuration that is adapted to be divided into one or more individual slots comprising one-minute slots, wherein each slot is adapted to store the one or more records.

11. The system of claim 1, wherein the plurality of machine-readable instructions are adapted to cause the system to: receive a user's login information that is available in a key.

12. A method comprising:
providing access to a distributed storage system comprising at least one server in at least one location;
storing data as time based data in the at least one server in a corresponding time slot of a time based configuration according to an expiration time; and
allowing retrieval of the stored data;
wherein if the time based data is accessed within the expiration time, at least one time operation is triggered, and if the time based data is not accessed for a time longer than the expiration time, the time based data is removed,
wherein the storing further comprises storing a primary copy of the data in a primary server and storing a secondary copy, which is a replicate of the primary copy, in zero or more secondary server(s).

13. The method of claim 12 further comprising performing basic operations on the stored data upon receiving requests from a client via an API.

14. The method of claim 12 wherein the storing further comprises encrypting the data.

15. The method of claim 12 wherein the providing access further comprises providing access by a virtual IP address shared by all servers of the distributed storage system, or by a dedicated IP address for a specific server of the distributed storage system.

16. The method of claim 12 wherein the storing further comprises storing the data in a record repository, wherein the data further comprises one or more records each having a record identifier.

17. The method of claim 16 further comprising managing the record repository using an index that allows fast searching of the one or more records by the record identifier.

18. The method of claim 16 wherein the one or more records are divided into fixed sized pages.

19. The method of claim 16 further comprising organizing the record repository by the expiration date of the one or more records.

20. The method of claim 19 wherein the organizing further comprises:
using a configuration having at least one entry representing a time slice; and
storing a linked list of records on each entry, wherein the expiration date of each record stored in the linked list falls inside the time slice.

21. The method of claim 12 wherein the time slot further comprises a one-minute time slot and the time based configuration further comprises a clock based main storage structure.

22. The method of claim 12 further comprising setting a default minimum storage time for which the time based data is stored when no expiration date is specified.

23. A distributed storage system comprising:
at least one or more servers located at geographically distributed locations, wherein the at least one or more servers are coupled to a load balancer at each location;
one or more processors; and
one or more memories adapted to store a plurality of machine-readable instructions which when executed by the one or more processors are adapted to cause the system to:
store one or more records using a configuration that is adapted to be divided into one or more individual slots, wherein each slot is adapted to store the one or more records, wherein the one or more individual slots expire as time passes such that all records in an expired slot are moved unless there is a data access that triggers at least one time operation before the one or more individual slots expire,
wherein the at least one or more servers further comprise a primary server adapted to store a primary copy of the one or more records and zero or more secondary server(s) adapted to store one or more secondary copies of the primary copy.

24. The system of claim 23 wherein when a secondary server fails, the primary server is adapted to reestablish connection with a different secondary server.

25. The system of claim 23, wherein the plurality of machine-readable instructions which when executed by the one or more processors are adapted to cause the system to allow retrieval of the one or more stored records.

26. The system of claim 23, wherein the configuration further comprises a ring-like configuration.

27. The system of claim 23, wherein the at least one time operation further comprises updating the one or more individual slots.

* * * * *

UNITED STATES PATENT AND TRADEMARK OFFICE
CERTIFICATE OF CORRECTION

| | |
|---|---|
| PATENT NO. | : 8,190,564 B2 |
| APPLICATION NO. | : 12/712514 |
| DATED | : May 29, 2012 |
| INVENTOR(S) | : Youlun Pang |

It is certified that error appears in the above-identified patent and that said Letters Patent is hereby corrected as shown below:

Please replace in Column 12, line 48, the word "foam" with "form".

Signed and Sealed this
Seventh Day of August, 2012

David J. Kappos
*Director of the United States Patent and Trademark Office*